Aug. 26, 1941.    W. C. WEBER    2,253,878
TRAY CLARIFIER
Filed July 27, 1940    4 Sheets-Sheet 1

INVENTOR
WILLIAM C. WEBER
BY
Arthur Middleton
ATTORNEY.

Patented Aug. 26, 1941

2,253,878

UNITED STATES PATENT OFFICE 2,253,878

TRAY CLARIFIER

William C. Weber, Westport, Conn., assignor to
The Dorr Company, Inc., New York, N. Y., a
corporation of Delaware Application July 27, 1940, Serial No. 347,837

11 Claims. (Cl. 210—55)

This invention relates to sedimentation and clarification. More particularly it relates to the removal by sedimentation of suspended solids, colloids and crystalloids from liquids carrying some or all of such substances and the consequent production of two products comprising a relatively dense sludge or sediment of settled substances and a relatively clarified liquid. The particular embodiment of the present invention resides in a tray clarifier comprising a tank divided by substantially horizontal partitions or trays, into a plurality of superposed compartments equipped with appropriate mechanism wherein may be carried out such operations as flocculation, sedimentation, and sludge or sediment thickening, some of said compartments being provided with means for the overflow and discharge of substantially clarified liquid.

The clarifier of the present invention is designed primarily for the treatment of sugar juice to remove non-sugar impurities therefrom in the form of sediment or mud. The invention, however, has suitability for other industries where suspended solids are to be removed from their carrying liquid by means of sedimentation, with clarified liquid being one end product from the machine, and a thickened sediment or underflow being another.

Sugar juice, being organic, offers especial problems in its clarification since its impurities are largely gums and cellulosic products often in colloidal and crystalloidal form. These tend to be difficultly settleable. For the purpose of making the impurities settleable, an object of this invention is to provide for flocculation, in the form of the known rotative bladed or paddle assemblies, for conditioning the suspended solids into settleability while at the same time to avoid having to rotate the flocculating paddles at normal flocculating speeds which are of the order of 1.5 feet per second. This may be accomplished in accordance with the invention by causing the feed liquid to enter the flocculation compartment of the tray clarifier tangentially so that thereafter there is a certain rotary motion imparted to the liquid in the flocculation compartment. The flocculating paddles or blades are rotated in this compartment countercurrent to the direction of rotation of the liquid. Thereby there can result relative motion between the flocculating blades and the liquid in the compartment that is of the order of 1.5 feet per second while the blades are not being rotated at that actual linear speed.

It has come to be accepted that best clarification is accomplished in a tray clarifier, if each sedimentation compartment thereof be supplied with a separate feed and a separate take-off of clarified liquid—see for instance the patent to Rolston, No. 2,195,739 of April 2, 1940. One manner of providing a separate feed of feed-liquid from a common supply in the form of a centrally disposed hollow column or cylinder that is tapped off to each settling compartment is to be seen in the patent application of Weber et al., Serial No. 227,464, filed August 30, 1938. That general method of feed is made use of in the embodiments of the present invention but in this invention the column extends upwardly into the flocculation compartment where its upper portion is provided with slots. More or less tangentially extending baffles are provided for deflecting rotating liquid from the flocculation compartment into the column through which it flows downwardly to be distributed to each of the subjacent settling compartments.

In said Weber invention, the mud or sludge from each superposed settling compartment is impelled into conduits which are formed within the feed column by means of chordal partitions. The idea behind such arrangement comprehended having the feed column divided into separate conduits through one of which feed liquid is supplied to individual compartments whereas mud or sludge from each compartment was passed therefrom into the mud conduits in the column and through them passed into the bottom compartment of the clarifier.

Such a divided column arrangement has many commendable uses and its objective of keeping the incoming feed out of contact with the downgoing mud to avoid mixing of these two materials is excellent. However, the apparatus of the present invention is designed so that the mud or sludge passes downwardly around the outside of the feed column, leaving the column to conduct solely the feed-liquid. Thus, in the apparatus of the present invention, the sludge path is annular and is defined by the exterior of the feed column as the bore of the annulus and by a succession of non-continuous cylindrical sections which are preferably non-aligned and which are supported from the feed column and spaced circumferentially therefrom. Mud in passing downwardly from each superposed compartment through this path forms an annular curtain of falling mud. This arrangement provides for a less congested sludge discharge due in part at least, to the fact that it is possible to provide a sludge passageway of large cross-sectional area and that is substantially unobstructed throughout its length. Furthermore, the sludge is enabled to drop freely from the central openings in the various trays and it is not necessary to force the sludge through small openings in order to introduce it into the vertical sludge passageway. In addition to its operative advantages the arrangement of the present invention is found to present features of economy and facility from a manufacturing standpoint.

It is also contemplated that the non-continuous cylindrical sections support rake arms for the sludge or mud rakes or scrapers which are adapted to traverse the bottom of each sedimentation compartment, incident to the rotation of the center column assembly, and convey or impel settled material toward the center and into the annular sludge passageway just described.

The center column assembly of cylindrical feed column and attached surrounding cylindrical sections forming the annular sludge passageway, either with or without the rake arms, is a complete compact entity and can be manufactured as such and supplied for use in the apparatus of the present invention or in existing clarifier structures of other design. Thus such assembly forms an important and novel article of manufacture and is a prime feature of the invention.

With the above mentioned and other objects in view, the invention consists in the construction and novel combination and arrangement of parts hereinafter described, illustrated in the accompanying drawings, and particularly pointed out in the claims hereto appended, it being understood that various changes in the arrangement, proportion and minor details of construction may be resorted to within the scope of the claims without departing from the spirit of the invention or sacrificing any of the advantages thereof.

Figures 1, 2:
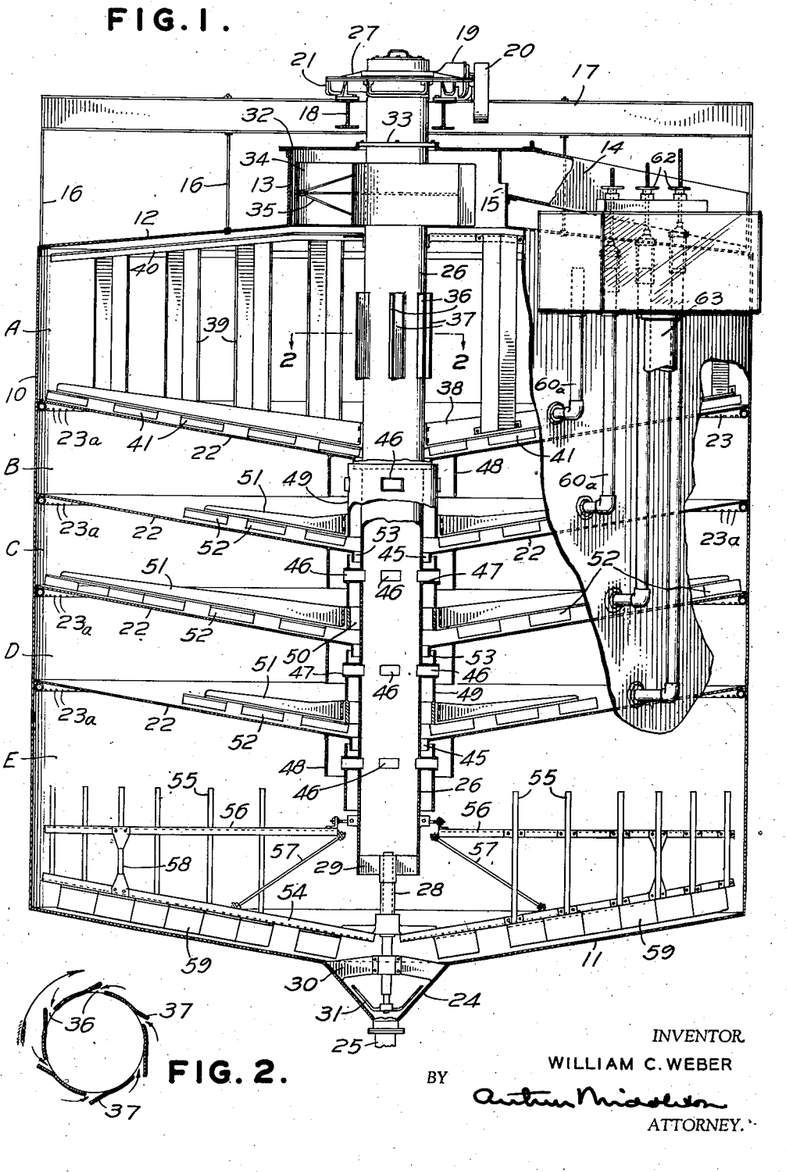
Figure 1 is a vertical sectional view substantially through the center of a round tray clarifier embodying features of the present invention.
Fig. 2 is a horizontal section through a portion of the central feed column taken on the line 2—2 of Fig. 1.

Referring first to Fig. 1, the general arrangement comprises a tray clarifier provided by a substantially round upstanding tank 10 having a bottom 11, preferably somewhat dished so as to slope toward the center, and a closed top furnished by a cover 12. While in some instances the cover 12 might be dispensed with, it is preferably employed when the device is used in the clarification of sugar juices, and the tank is preferably insulated in order to retain heat, since the clarification efficiency in sugar juices is a maximum at elevated temperatures. A scum chamber 13 extends upwardly from the cover 12 in open communication therethrough with the uppermost compartment of the tank. From the scum chamber 13 there leads a closed launder or conduit 14 through which scum, arising within the chamber 13 and passing over a weir 15 may be led to a point of ultimate disposal.

Spaced above the scum chamber 13 and supported from the tank top 12 by means of suitable legs 16, is a bridge or platform structure composed of sets of horizontal beams 17 and 18. These beams form a seat for motivating means comprising a motor 19, power transmission mechanism 20 and stationary bearing means 21, which latter rotatably supports the rotating center column assembly to be hereinafter described.

The interior of the tank 10 is divided by a series of substantially horizontal dished trays or partitions 22, into a plurality of superposed compartments comprising an upper flocculation or feed compartment A, intermediate settling or sedimentation compartments B, C, and D, and a lower sedimentation and sludge thickening compartment E. The feed supply enters the flocculation compartment A where it is subjected to mechanical agitative flocculation treatment as hereinafter described, and passes from thence through the central feed column to be distributed to the lower compartments B, C, D, and E, respectively. Sedimentation takes place in each of these lower compartments and a substantially clarified liquid is allowed to pass therefrom through clarified liquid draw-off pipes 23, the form and nature of which will be presently described. All sediment or mud settling in each of the compartments B, C, and D, is mechanically conveyed toward the center of the machine and into the vertical center sludge passageway to be hereinafter detailed, all sludge thus passing downwardly into the lowermost compartment E. In this compartment, means are preferably provided for inducing thickening of sludge and the release therefrom of entrapped liquid, and means are also provided for mechanically conveying sludge toward the center and into the central sludge discharge hopper 24 from whence all sediment removed from the liquid in the apparatus is discharged by means of a valved pipe 25.

The feed column or conduit, constituting a prime feature of novelty in the present invention, extends vertically through the central portion of the tank and supports all of the moving parts of the device, actuation of which is effected by rotation of the feed column. In the present embodiment the feed column comprises an integral tubular column 26 which carries adjacent its upper end an annular surrounding bearing means, indicated generally at 27, which rests upon and cooperates with the fixed annular bearing means 21 and thus rotatably supports the feed column. Suitable gearing means, preferably of the worm type, are associated with the bearing means 27 or the upper end of the column 26, whereby the same may be rotated at a desired speed by the motor 19 and power transmission mechanism 20. At its lower end, the column or tube 26 carries a fixed centrally disposed extension in the form of a shaft 28, secured in the lower end of the feed column by a spider 29. The shaft 28 extends through a steady bearing 30, for the purpose of steadying the entire mechanism, and carries at its lower end a plow or scraper 31 which is adapted to rotate in the sludge hopper 24 and discourage the packing or solidification of mud or sludge therein.

Figures 4, 5, 6:
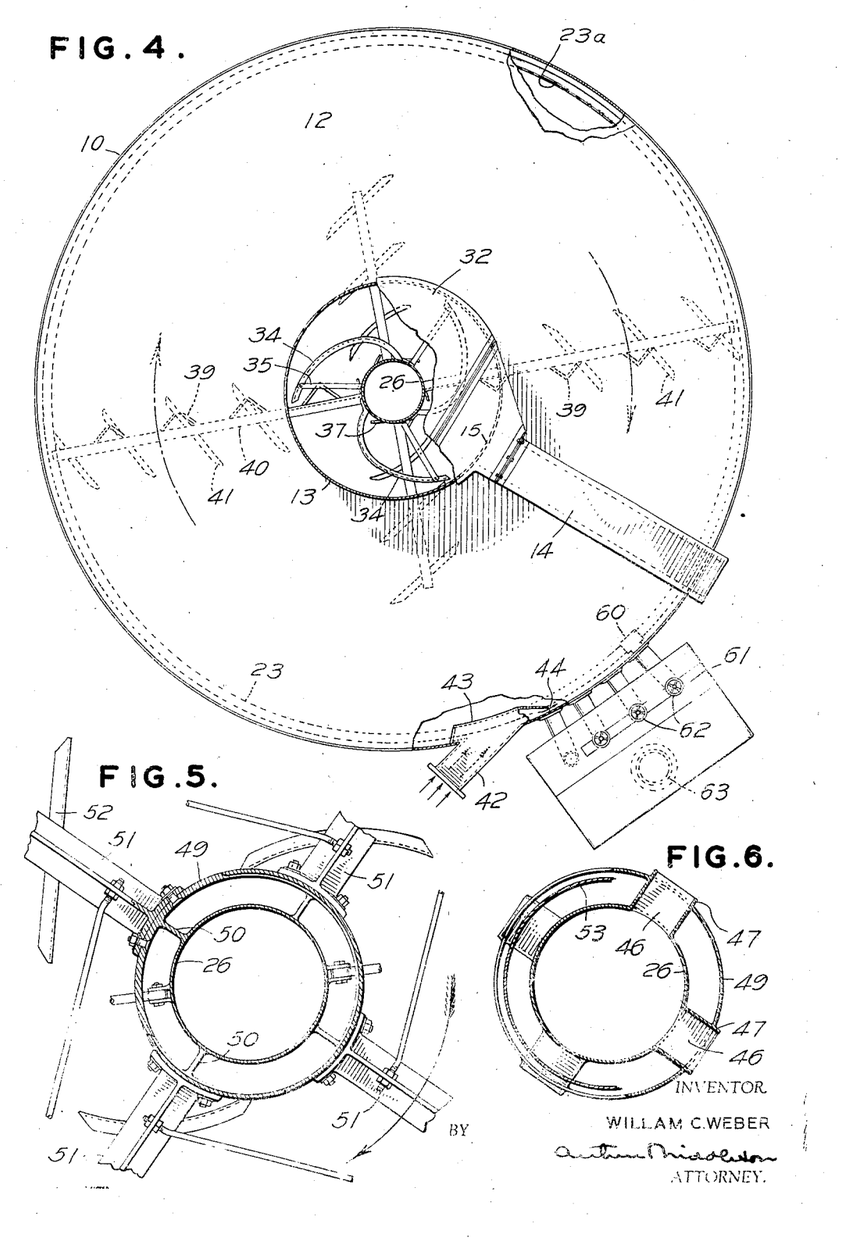
Fig. 4 is a plan view with certain parts broken away looking down on the embodiment of Fig. 1.
Fig. 5 is a horizontal section on the line 5—5 of Fig. 3.
Fig. 6 is a horizontal section on the line 6—6 of Fig. 3.

The column 26 extends through a central opening in a cover plate 32 which forms the top of the scum chamber 13 and an insulating gland or ring 33 is provided to seal the opening through which the feed column passes. Within the confines of the scum chamber 13 the feed column 26 carries, in rigid fashion, one or more scum scrapers or squeegees 34, in the form of arcuate or helical strips attached at one end to the feed column and strengthened by suitable braces 35. The squeegees 34 are positioned with their convex sides faced toward the direction of rotation of the center column assembly. When the apparatus is employed in the clarification of hot limed sugar juices, considerable foam is produced in the liquid undergoing treatment and this foam rises to the top and ultimately into the scum chamber 13, where it is confined by the side wall of the chamber and the cover plate 32. Thus, it will be seen that rotation of the squeegees 34 in the direction indicated by the arrows in Fig. 4 will force the scum toward the peripheral wall of the scum chamber and ultimately over the weir 15 where it can flow by gravity through the scum discharge conduit 14.

Immediately below the scum chamber 13 is the uppermost compartment A of the clarifier which forms the flocculation zone or compartment wherein new feed is subjected to gentle mechanical agitation to promote the amassment and coagmentation of minute solids, colloids and crystalloids into flocs or agglomerates of settleable size. At a location on the feed column 26 that will normally be within the compartment A, the column is provided with a radially arranged series of ports or openings in the form of elongated slots 36 with which there are associated what may be termed tangentially extending baffles 37 which extend from the trailing vertical edges of the slots 36 in the direction of rotation of the column 26 for a purpose which will presently appear.

Also within the confines of the upper compartment A, the column 26 supports in rigid fashion a series of radially spaced vertical flocculating blades or paddles which are adapted to rotate with the column and assist the flocculation action. In the present embodiment this flocculator mechanism compriess arms 38 attached to the center column 26 at radially opposite points and extending outwardly toward the circumferential wall of the tank 10 and spaced somewhat above and substantially paralleling the upper surface of the uppermost tray 22. The arms 38 support a radially spaced series of fixed blades or paddles 39 which may also be steadied by suitable braces 40 extending from the conduit 26 adjacent the top 12 of the tank and the flocculation compartment A. It will be understood that rotation of the blades 39, co-incident with rotation of the center column 26 will impart a general agitative effect to the contents of the compartment A for the purpose of promoting flocculation thereof. In this operation it is desired that the agitation, although definite and positive, be as gentle as possible with a minimum of disruptive effect upon the flocculated and flocculating particles. For this reason, it is preferred that the blades 39 be substantially V-shaped in cross section with the apexes of the V's pointing in the direction of rotation, as is clearly seen in Fig. 4. These V-shaped flocculator blades produce a maximum horizontal deflection in the liquid with a minimum tendency toward vertical drift. For the purpose of removing any sediment that might settle upon the bottom of the compartment A, the arms 38 may carry a plurality of sludge scrapers or rakes 41, preferably of the well known Dorr type, which are adapted to convey any sediment on the bottom of the compartment A toward the center of the apparatus and into the vertical sludge passageway to be hereinafter described.

As has been indicated previously it is an established fact that, in the mechanical flocculation of suspended solids, by means of moving or rotating paddles or blades, the most effective results are produced if the paddles are caused to move at a speed of about 1.5 feet per second. However, since the center column 26 carries the well known sludge rakes or scrapers in each of the settling compartments of the clarifier, it is undesirable to rotate the column 26 at a speed sufficient to cause blades 39 to travel at a rate of about 1.5 feet per second, because such operation would then revolve the sludge rakes at a speed that would be so great as to interfere with satisfactory sedimentation. Therefore, in the present invention, the contents of the flocculation compartment A are caused to swirl or to be maintained in gentle rotary motion, which is in a direction opposite to that in which the column 26 and flocculator blades 29 travel. For this purpose the supply of feed to the device, all of which first enters the flocculation compartment, is furnished through a feed conduit 42, which enters the flocculation compartment A through the peripheral wall thereof in a tangential manner. At the point of entry of the feed supply pipe 42 there is provided interiorly of the tank wall, a feed baffle 43 which is arranged to afford only a narrow constricted passage 44 through which the feed must flow into the compartment A. The flow of feed is thus materially constricted and issues through the passage 44 under considerable pressure, thus assuring the maintenance in the compartment A of a positive rotary motion of the contents thereof in a direction opposite to that of the direction of rotation of the column 26 and flocculator blades 39. It is thus found that, with the column 26 rotating at a speed satisfactory for efficient sludge raking, and the contents of the flocculation zone A rotating or swirling in the opposite direction, there can be set up a relative movement between the blades 39 and the contents of the flocculation zone A that is of the order of about 1.5 feet per second. Thus, an efficient flocculation treatment is given to the contents of compartment A and the flocculated liquid, after having entered at the periphery of the compartment and traversed its area while being subjected to the gentle mechanical agitation, enters the hollow feed compartment 26 through the openings or slots 36, being positively directed thereinto by means of the tangential baffles 37. The flocculated liquid then flows downwardly through the column 26 and is distributed to the various subjacent settling compartments as will presently appear.

The tubular feed column 26 extends downwardly through suitable central openings 45 provided in each of the trays 22, the openings 45 being of sufficient diameter to provide ample clearance around the feed column for forming part of the vertical sludge passageway as will hereinafter appear.

Figure 3:
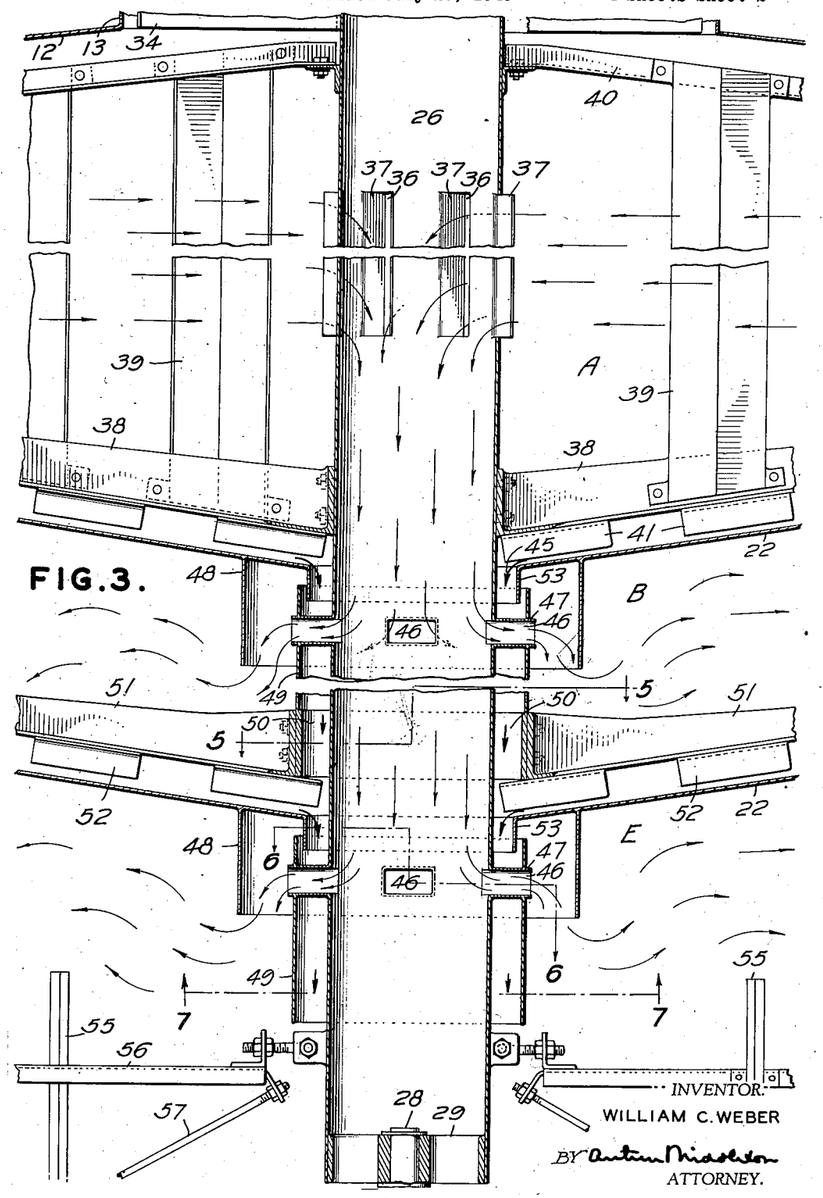
Fig. 3 is an enlarged fragmentary vertical section through a portion of the central feed column and adjoining settling compartments and the flocculation compartment of the apparatus shown in Fig. 1.

The said column extends a considerable distance downwardly into the lowermost compartment E where it is provided with the shaft extension 28 as previously described. From the feed column 26 the downwardly flowing flocculated liquid passes into each of the compartments B, C, D, and E through openings or ports 46 which are located in the side wall of the feed column at points slightly below each of the trays 22, and are preferably four in number and spaced equi-distant about the periphery of the feed column. From each of the ports 46 there extends a short horizontal conduit 47 through which the feed passes to flow into each of the sedimentation compartments. The conduits 47 are also utilized for the support of the non-continuous cyindrical sections forming the peripheral boundary of the sludge passageway as will hereinafter appear. It is understood that the outlet ports 46 and feed conduits 47 should be unobstructed and as large cross sectionally as is practicable and as short as possible in order to minimize any tendency toward disruption of the delicate floc structures in the flocculated liquid. It will be appreciated that the number and cross sectional area of the ports 46 and conduits 47 will provide for an ample volume of feed to each of the compartments B, C, D, and E proportional to the amount and rate of withdrawal of clarified liquid through the overflow or draw-off pipes 23. Downwardly depending annular boots or baffles 48 are provided on the undersurface of each of the trays 22, which surround the feed conduit and associated sludge passageway, and are spaced somewhat from the outer ends of the feed conduits 47. These boots serve the purpose of deflecting feed to each compartment downwardly and prevent short circuiting of the incoming liquid so as not to disturb the supernatant layer of clarified liquid which normally exists in the upper portion of the settling compartments.

In each of the compartments B, C, D, and E, the feed column 26 carries in rigid fashion a surrounding short cylindrical sleeve or section 49 which is supported primarily by the conduits 47, which extend through its peripheral wall, and which may also be attached to the column 26 by webs 50 integral with the column 26 and sleeves 49 or welded to each. Rigidly attached to and carried by the lower ends of the sleeves 49 are the radially extending rake arms 51 which carry the well known sludge rakes or scrapers 52. These sets of rake arms and blades are preferably four in number, spaced about the periphery of the sleeves 49 approximately 90° from one another. As is customary practice one diametrically opposite set of rakes preferably extends substantially to the peripheral wall of the tank, whereas the other diametrically opposite set is somewhat shorter, with the long and short sets being arranged in staggered relation in the compartments in descending order as clearly seen in Fig. 1.

These raking assemblies rotate slowly co-incident with turning of the center column 26 and convey sediment or mud settling upon the upper surface of each tray 22 towards the center thereof, where it is ultimately impelled into and cascades downwardly through the central tray openings 45. At the edge of each opening 45, each tray 22 is provided with a short downwardly depending baffle or boot 53 which overlaps and telescopes within the upper end of each of the sleeves 49, thus forming a liquid seal to prevent sludge passing downwardly through an opening 45 from entering and mixing with the contents of the next lower compartment. It will thus be seen that the sediment from all of the compartments A, B, C, and D is impelled toward the central openings 45 and flows downwardly therethrough and through the annular sludge passageway formed by the wall of the conduit 26 and the cylindrical sleeves 49, being effectively confined therein by the overlapping or telescopic arrangement of the sleeves 49 and the boots 53. On the other hand, some of the liquid within each of the settling compartments may pass over the upper edge of the sleeves 49 and into the annular space between said sleeves and the boots 53 and thus exist therein in the presence of the falling mud and thereby effectively discourage any tendency for the falling mud to cake or deposit upon the annular surfaces. The falling mud thus forms a complete annular curtain confined between the column 26 and the sleeve 49 and falls in substantially unhindered and unobstructed manner into the lowermost compartment E, where it all finally deposits upon the upper surface of the tank bottom 11 and is raked into the discharge hopper 24.

In the lower compartment E there is provided a sludge thickening mechanism in the form of what has become known as a picket fence thickening mechanism. For this purpose the shaft extension 28 fixedly supports the radially extending arms 54 to which are secured the upstanding palings or stirrers 55. These palings may be further braced by arms 56 carried by the lower end of the tubular column 26 and by suitable guys 57 and braces 58. It is understood that, in the normal operation of the device, a substantial accumulation or blanket of mud or sludge is maintained in the lower compartment E upon the bottom 11. The palings 55, rotating slowly through the upper strata of this sludge blanket, produce voids therein in their wake which permit the up-flow from the sludge blanket of entrapped liquid released by the stirring action of the palings. Thus, there finally accumulates in the lower stratum of the sludge blanket and immediately upon the bottom 11, a dense sludge which is conveyed and impelled by the rakes or scrapers 59 carried by the arms 54, to and into the discharge hopper 24 from whence the thick sludge or mud can be drawn continuously or periodically through valved outlet pipe 25.

The clarified liquid overflow or withdrawal pipes 23 in each settling compartment extend about the periphery of the compartment and adjacent its uppermost extremity and are provided with openings or ports 23a for permitting clarified liquid to pass into the overflow pipes. Each draw-off pipe 23 is provided with a T-joint or fitting 60, the leg of which extends through the outer wall of the tank 10 and is connected with a vertical riser or standpipe 60a which rises to the overflow box 61 wherein the effective overflow height of each sedimentation compartment, except the uppermost, can be controlled by means of hand wheels 62 adapted to operate adjustable slidable sleeves on the upper ends of the standpipes. The clarified liquid passes from the overflow box 61 through the discharge pipe indicated at 63 and may be disposed of or otherwise treated as desired. The stand-pipes and overflow box 61 and their functions and modes of operation are well known in the art, preferably taking the form seen in the Rolston Patent No. 2,195,739.

In the operation of the device, in treating sugar juices for the removal of suspended impurities, the hot limed juice is introduced into the flocculation compartment A tangentially through the supply pipe 42 and restricted inlet passageway 44, thus maintaining a definite swirling or rotary motion in the contents of the flocculation zone. At the same time, the center column 26 is rotated in the opposite direction, as indicated by arrows in Fig. 4, causing the flocculator blades 39 to travel slowly about the compartment A. There is thus set up between the swirling liquid and the rotating flocculator blades a relative motion which may be of the order of 1.5 feet per second, resulting in efficient amassment and coagmentation of the suspended particles in the liquid into floc structures of settleable size. The flocculated liquid is directed by the tangential baffles 37 through the ports 36 and passes downwardly through the tubular feed column 26 and emerges into each of the settling compartments B, C, D and E, through the ports 46, and feed conduit sections 47, being given a downward direction in each settling compartment by the annular baffles 48. In each of these settling compartments the mud settles upon the upper surface of each tray 22 by the action of sedimentation and a relatively clarified liquid passes into the overflow pipe 23 through the ports 23a, and from thence into the overflow box 61 to ultimate disposal.

The mud or sediment on the upper surface of each tray 22 is continuously urged and impelled toward the central openings 45 by the rotating sludge rakes 41 and 52 and passes downwardly through the annular passageway formed by the tubular column 26, and the cylindrical sleeves 49, possibly assisted by the presence of a small amount of liquid which may pass over the upper ends of the sleeves 49. Thus the mud is passed downwardly completely through the clarifier and is effectively confined throughout its downward travel and does not at any time come into contact with the feed passing to each compartment. It is ultimately delivered to the lowermost compartment E where it is thickened by the picket fence mechanism 55, along with solids settling in that compartment. All of the mud eventually settles into a relatively dense structure upon the tank bottom 11 and is raked to discharge by the lower sludge rakes 59. The flow paths of the feed liquid and of the sludge in its confined vertical passageway are clearly illustrated in Fig. 3, where the large arrows indicate the flocculated feed entering the column 26 and passing to the several settling compartments through the ports 46 and conduit sections 47. The sludge path is indicated by the small arrows passing downwardly through the vertical sludge passageway. This passageway, as is readily seen, is annular in form and presents no angular surfaces upon which the mud can deposit and cake.

Figures 7, 8, 9:
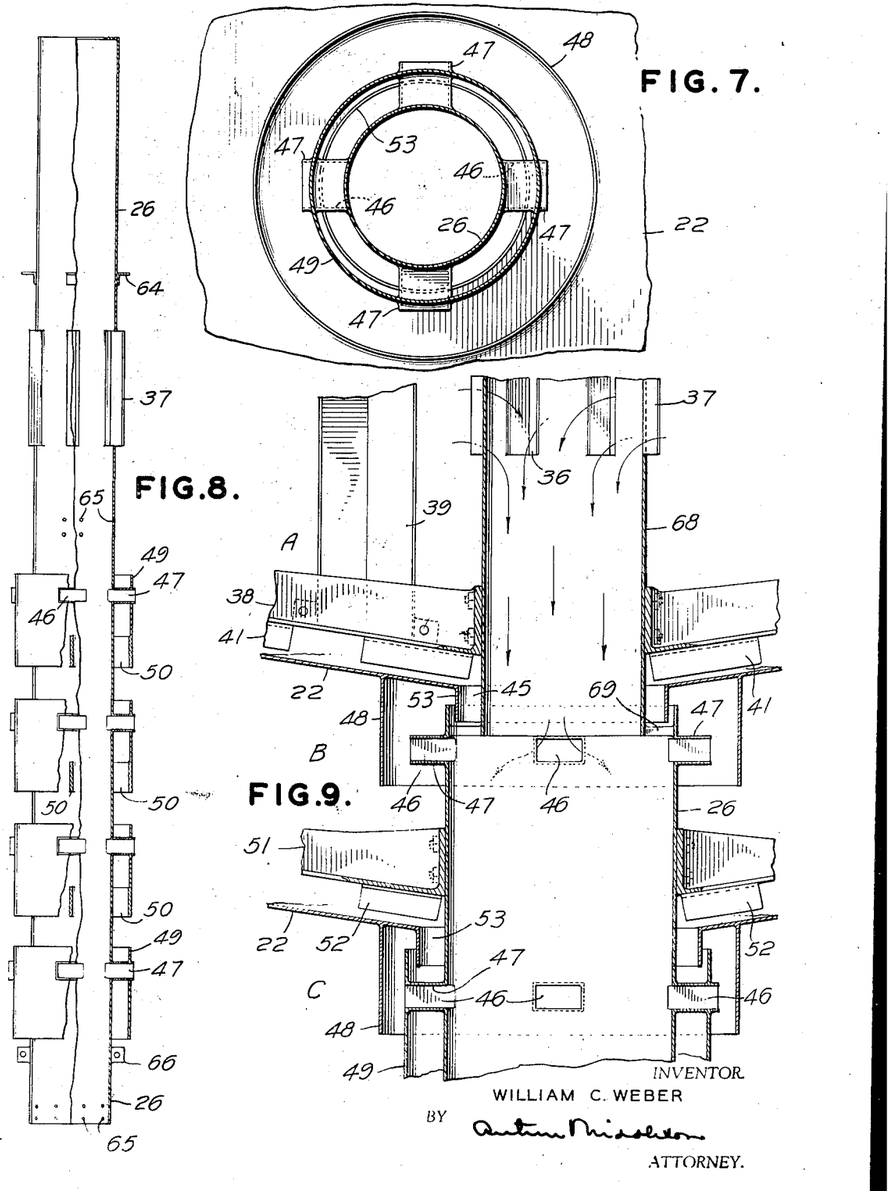
Fig. 7 is a horizontal section on the line 7—7 of Fig. 3 looking upward as indicated by the arrows.
Fig. 8 is an elevation, partly in section, of the center column assembly showing the cylindrical feed column and surrounding cylindrical sections forming the annular sludge passageway.
Fig. 9 is an enlarged fragmentary vertical section similar to Fig. 3 and showing a modified form of the central column assembly of the invention.

Figure 8 shows the center column assembly of tubular feed column and associated surrounding sleeves for defining the sludge passageway, which assembly constitutes a prime novel feature of the invention and may be manufactured and furnished as a complete entity ready to install in existing tank structures. The essential elements of this integral assembly are seen to be the tubular conduit 26 provided with suitable ports or openings 36 in its upper portion with which may be associated the tangential baffles 37. These baffles may of course be dispensed with and, if present, may be easily provided by being punched out from the wall of the tubular column to provide the openings 36, leaving the punched out sections disposed at an oblique angle to form the baffles 37. At lower portions of the column 26 there are provided the ports 46 and outwardly extending short feed conduits 47, associated with the ports 46 and supporting the circumferentially spaced sleeves 49, which may be further attached to the column 26 by webs 50 as previously mentioned. This center assembly may of course be provided with various means, such as brackets 64, bolt holes 65 and ears 66 for the purpose of attaching cooperative parts such as the flocculator arms 38 and 40, rake arms 51, and the like. It is understood however, that these are not essential elements of the assembly and may be provided or installed in the field when equipping a tray clarifier with the center assembly of this invention. It is also understood that the center assembly may be made and furnished as a complete device with rake arms and blades, flocculator mechanisms, and sludge thickening devices, or any of them attached and made a unitary part thereof.

Fig. 9 illustrates a modification in the construction and arrangement of the center assembly. The construction of this figure is arranged so that all of the material discharged from the flocculation compartment A must necessarily pass into the feed section of the center assembly. To accomplish this, the feed column 26 is interrupted at a point adjacent the upper part of the uppermost settling compartment, and its remaining upper portion is in the form of a separate tubular section of smaller diameter. Thus, there is provided the upper tubular section 68 which is of smaller diameter than the main portion of the feed column 26. The section 68 is of sufficiently small diameter to be received within the downwardly depending boot 53 and provide annular clearance therewith for permitting material to pass downwardly through the opening 45 and into the main portion 26 of the feed column. The section 68 is firmly and rigidly attached to the main feed conduit 26 by means of webs or spider connections 69 and is supported at its upper end in the same manner illustrated in Figure 1. Thus, the discontinuous but rigidly united sections 68 and 26 rotate as a unit for the purpose hereinbefore clearly set forth. The main section 26 of the feed column telescopes with and surrounds the boot 53 to form a liquid seal and prevent any sludge passing through the opening 45 from entering the settling compartment B.

In other respects, the center assembly of Figure 9 operates in the same manner as does that of the previously described form. The essential characteristic of the device of Figure 9 is that the interrupted and telescoped arrangement of the sections 26 and 68 provides that the sludge passageway 45 from the flocculation zone A communicates with the interior of the said conduit 26. This assures that all of the material treated in the flocculated zone A will pass into the feed conduit and ultimately be subjected to sedimentation in the subjacent settling compartments.

The lower portions of the feed column 26 in all of the settling compartments are constructed and arranged in the same fashion seen in Figures 1 and 3, the essential difference between the two modifications being that in Figure 1 any sediment settling in the flocculation compartment is passed into the vertical sludge passageway and falls to the lowermost compartment with settled sludge from other settling compartments. On the other hand, in the modification of Figure 9 any sediment from the flocculation zone is passed, along with liquid entering the ports 36, directly into the main feed column 26 and is subsequently subjected to sedimentation in the subjacent settling compartments.

In any form of the invention, however, the principal characteristics include a plurality of superposed settling compartments surmounted by a feed chamber which preferably contains mechanical flocculating means, a centrally disposed tubular rotative member which supports and actuates sludge raking elements and also constitutes a conduit for distributing liquid from the feed or flocculation chamber to the various settling compartments, and means defining an annular vertical sludge path, surrounding but functionally separated from the tubular feed conduit, whereby sludge is passed into the lowermost compartment from upper compartments.

Thus the feed of liquid to be clarified is distributed to the various settling compartments evenly and with a minimum tendency toward disruption of floc structures, while at the same time sludge or sediment, which in the case of sugar juice, is highly thixotropic in nature, is passed from upper compartments to the lowermost one along a clear and unobstructed vertical pathway without contaminating the feed liquid or disturbing the contents of the compartments. There is found to result a marked increase in the clarification capacity of a given size of clarifier and a generally enhanced efficiency in the all around operation.

What is claimed is:

1. A tray clarifier comprising a tank, a plurality of substantially horizontal partitions mounted in said tank and dividing the latter into a plurality of superposed compartments and each formed with a central opening, means for introducing liquid to be clarified into the uppermost of said compartments, a vertical center column assembly rotatably mounted in said tank and extending through the central openings in said partitions and formed to provide separate concentrically arranged vertical passageways, one of said passageways constituting a feed conduit, ports in the conduit in communication with said compartments for conducting liquid to be clarified from said uppermost compartment to the subjacent compartments, and the other of said passageways being open at its lower end to the lowermost compartment and comprising wall portions with openings between them in communication with the upper compartments and adapted to discharge into the lowermost compartment settled sludge received from upper compartments, means for rotating said assembly, means in each of said upper compartments for impelling solids settling therein toward the center thereof and into said last mentioned openings, means for withdrawing clarified liquid from some of said compartments, and means for withdrawing settled sludge out of the clarifier from the lowermost compartment thereof.

2. A tray clarifier as specified in claim 1, in which the uppermost compartment is adapted for use as a flocculation compartment, rotative bladed assemblies in said flocculation compartment for promoting amassment of minute particles of flocs of settleable size and means for rotating said bladed assemblies, and in which the said feed conduit is adapted to pass said flocs with relatively small disintegration thereof into the subjacent compartments.

3. A tray clarifier as specified in claim 1 in which the said sludge passageway surrounds the said feed conduit.

4. In a tray clarifier comprising a plurality of superposed compartments and substantially horizontal partitions separating said compartments and each formed with a central opening, means for feeding liquid to be clarified into the uppermost of said compartments and means in the compartments for impelling sludge settling therein toward said central openings, a vertical rotatable center column assembly serving as a support for said sludge impelling means and comprising a tubular member extending through said openings and having inlet ports within the uppermost compartment for the admission to said tubular member of liquid to be clarified and having outlet ports communicating with the subjacent compartments for the feed thereto of liquid from said uppermost compartment, and cylindrical sleeves surrounding said tubular member in said adjacent compartments and spaced circumferentially from said tubular member to provide an annular vertical sludge passageway open at its lower end to the lowermost compartment and spaced apart at levels adjacent said openings to provide sludge outlets from the compartments above the lowermost compartment to said sludge passageway, means connecting said sleeves to said tubular member without obstructing said sludge passageway, and means for rotating said center column assembly.

5. As an article of manufacture, a central column assembly adapted to be rotatably mounted in a tray clarifier having an upper feed compartment and having subjacent settling compartments with partitions between said compartments and each having a central opening, said assembly comprising a tubular member having inlet ports in its upper portion adapted to be located within the feed compartment of the clarifier in which the assembly is mounted and to extend through the central openings thereof, said tubular member also having sets of vertically spaced outlet openings, each set of outlet openings being located within a corresponding settling compartment of the clarifier in which said assembly is mounted, and cylindrical sleeves surrounding said tubular member and spaced circumferentially therefrom to provide an annular vertical sludge passageway surrounding said tubular member and open at its lower end, said sleeves being spaced apart and disposed so as to be located within the respective settling compartments of the tray clarifier in which said assembly is mounted and to provide inlets into said annular passageway from the different compartments of said clarifier above its lowermost compartment, and means connecting said sleeves to said tubular member without obstructing flow through said annular passageway.

6. An article of manufacture as specified in claim 5 comprising baffles associated with the said inlet ports in the upper portion of said tubular member and extending tangentially away from the latter.

7. As an article of manufacture, a central column assembly for a tray clarifier having an upper feed chamber and subjacent settling compartments and separated by partitions each formed with a central opening, said assembly comprising a tubular member having inlet ports in its upper portion and having spaced sets of outlet ports in a lower portion, relatively short conduits extending laterally from said outlet ports to said settling compartments and sleeves surrounding said tubular member, one adjacent each of said sets of outlet ports and being supported by the corresponding laterally extending conduits.

8. In a tray clarifier comprising an upper flocculation compartment and a plurality of subjacent settling compartments and substantially horizontal partitions separating said compartments and each formed with a central opening in alignment with the central openings of the other partitions, mechanical flocculating means in said flocculation compartment and means in the settling compartments for impelling sludge settling therein toward said central openings, a vertical central column assembly rotatively mounted in said clarifier and serving as a support for said flocculating and sludge impelling means and comprising a tubular member extending through said openings and having inlet ports within said flocculation chamber for the admission to said tubular member of flocculated liquid and having outlet ports communicating with said settling chambers for the feed thereto of flocculated liquid, cylindrical sleeves surrounding said tubular member and located in said settling compartments and spaced circumferentially from said tubular member to provide a vertical sludge passageway open at its lower end to the lowermost compartment and spaced apart at levels adjacent said openings to provide outlets from the compartment above the lowermost compartment to said sludge passageway, said clarifier also comprising a scum chamber above said flocculation compartment and having an outlet for scum, and means carried by said tubular member for forcing scum through said outlet.

9. A tray clarifier comprising a plurality of superposed sedimentation compartments and partitions separating said compartments and each formed with a central opening, and comprising a feed chamber above said compartments, means for feeding liquid to be clarified into said chamber, a structure rotatably mounted in said clarifier and comprising means in said compartments for impelling sludge settling therein toward said central openings and also comprising a body portion extending through said openings and including a central vertical tubular wall element surrounding a passage and formed with lateral ports at the levels of said chamber and the different compartments through which said chamber and compartments are in communication with said passage whereby said passage and ports form a feed flow path for the downflow of liquid from said chamber to the different compartments, said body portion also comprising cylindrical wall elements surrounding and spaced away from said tubular wall element to form an annular sludge flow path surrounding but separated from the first mentioned flow path, said cylindrical elements being spaced apart to form openings through which said sludge path communicates with the different compartments and is adapted to discharge into the lowermost compartment settled solids received from the other compartments, means for rotating said structure, means for withdrawing clarified liquid from the different clarifying compartments and means for passing settled solids out of the clarifier from the lowermost compartment thereof.

10. In the operation of a tray clarifier having an upper flocculation compartment and subjacent settling compartments, and also having rotative mechanical flocculating means in said flocculation compartment and rotative sludge raking elements in said settling compartments all supported from and rotated by a common unitary rotative central column, the method which comprises rotating said central column and the mechanism supported therefrom at normal sludge raking speeds to cause said sludge raking elements to impel settled solids toward the center to said compartments without interfering substantially with sedimentation, introducing liquid to be flocculated and clarified into said flocculation compartment in a tangential manner and in a direction to impart to the contents of said compartment a swirl which is in a direction opposite to that of the rotation of said mechanical flocculating means, and controlling the introduction of said liquid and the speed of the resultant swirl so that there results between the contents of said flocculation compartment and said mechanical flocculating means a relative movement which is of the order of 1.5 feet per second.

11. In the operation of a tray clarifier having an upper flocculation compartment and subjacent settling compartments, and also having rotative mechanical flocculating means in said flocculation compartment and rotative sludge raking elements in said settling compartments all supported from and rotated by a common unitary rotative central column, the method which comprises rotating said central column and the mechanism supported therefrom at normal sludge raking speeds to cause said sludge raking elements to impel settled solids toward the center of said compartments without interfering substantially with sedimentation, introducing liquid to be flocculated and clarified into said flocculation compartment, causing the contents of said compartment to swirl in a direction opposite to that of the rotation of said mechanical flocculating means, and controlling the speed of the swirl so that there results between the contents of said flocculation compartment and said mechanical flocculating means a relative movement which is of the order of 1.5 feet per second.

WILLIAM C. WEBER.